UNITED STATES PATENT OFFICE.

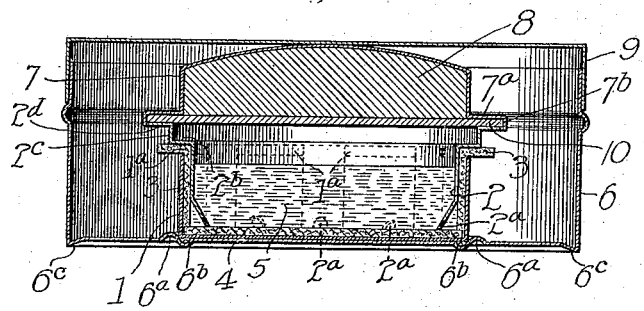

GEORGE W. BENNETT, OF CHICAGO, ILLINOIS.

MEDICAMENT VAPORIZER AND BURNER.

1,211,389.  Specification of Letters Patent.  Patented Jan. 9, 1917.

Application filed January 11, 1912. Serial No. 670,613.

*To all whom it may concern:*

Be it known that I, GEORGE W. BENNETT, a citizen of the United States, residing at Chicago, in the county of Cook and State of Illinois, have invented a certain new and useful Improvement in Medicament Vaporizers and Burners, of which the following is a specification.

My invention relates to burners or heaters and while I have in the present instance shown my invention as embodied in a burner for a medicament vaporizer and used in connection with certain parts going to make up a complete apparatus of this character, yet as hereinafter made apparent, my burner may be used for different purposes and with a different character of fuel than as usually employed in such vaporizers.

The object of my invention is to provide a simple compact portable burner or heater arranged to use any suitable fuel such as alcohol, kerosene, paraffin, etc. When the burner is used in connection with a vaporizer the liquid-holding receptacle which contains the medicament and its holder is utilized as an inclosing box or casing, the cover of such box being also utilized as a support or stand for the burner, etc.

The various features of advantage and utility of my invention will be apparent from the description hereinafter given.

In the drawing Figure 1 is a central section of my burner forming a part of a vaporizer, all of the parts being here shown in their assembled or packed form; Fig. 2 is a similar section illustrating different parts in position for use as a vaporizer; Fig. 3 a perspective of the cup or fuel receptacle of the burner illustrated in Figs. 1 and 2; Fig. 4 a sectional elevation similar to that of Fig. 1 but illustrating a modified construction; Fig. 5 a perspective of the cup or fuel receptacle of Fig. 4 and Fig. 6 a detailed view of another modified construction of burner.

Referring to the embodiment of my invention as illustrated in Figs. 1, 2 and 3 and describing it as used in connection with a vaporizer, the burner consists essentially of a fuel receptacle and a wick extending upwardly along the inner sides of such receptacle and projecting laterally therefrom, such receptacle being so constructed as to support another receptacle of larger size or diameter containing the liquid in which the medicament is placed. In Figs. 1 and 2 this fuel receptacle is shown as comprising two portions and in Figs. 4 and 5 as comprising a single portion.

Referring to Figs. 1, 2 and 3 the fuel receptacle consists of a cup 1 open at its top and closed at its bottom and an inner shell 2 which is of such a diameter that when it is introduced within the cut it forms therewith an annular space adapted to receive the wick. By preference a plurality of wicks 3 are employed the same rising vertically along the inner walls of the cup and within said annular space and being preferably in contact with a wick 4 resting upon the bottom of the cup and common to all of the wicks 3. This annular space which contains the wicks has communication in any suitable manner with the interior of the shell 2, as for instance by means of the openings $2^a$ at the bottom thereof. The interior of this shell forms a fuel chamber in which may be introduced any suitable fuel indicated at 5, such as alcohol, kerosene, paraffin, etc., the latter being the fuel preferred, when the device is to be used as a vaporizer. The cup 1 is provided at its upper portion with a series of wick openings $1^a$ formed by notching the upper edge of such cup, as clearly illustrated in Fig. 3, it being understood that the upper ends of the plurality of wicks extend through said openings and project laterally from the cup as shown in Figs. 1 and 2. The inner shell is provided with a series of right angled marginal flanges $2^b$, $2^c$ and $2^d$, the flange $2^b$ resting upon the top edge of the cup 1 and projecting together with the other flanges beyond the lines of the cup. The top or outermost flange $2^d$ forms a support for the box or receptacle 6 which is of greater size or diameter than the burner. This latter receptacle is adapted to contain the medicament holder 7, the medicament, such as formaldehyde, being contained in a suitable holder indicated at 8. In practice this receptacle 6 together with the lid 9 forms a box or inclosing casing for the remainder of the parts as indicated in Fig. 1 and the same are utilized as parts of the vaporizer as shown in Fig. 2, the receptacle 6 containing the water or liquid in which the medicament holder is immersed and the lid 9 forming a support or stand for the burner.

As shown the cup or outer shell 1 and the inner shell 2 are cylindrical and are concentrically arranged with the result that an annular space is formed between their walls. The wick fits within this annular space and in practice the wick is inserted within the cup or outer shell before the inner shell is introduced, so that the wick has an equal pressure applied to it all around in case of a single wick or the separate wicks have a pressure applied thereto which is uniform, with the result that the rate of feed of fuel is established and made uniform all the way around the burner, that is on all sides thereof.

When the parts are assembled and packed ready for the market they have the relative position indicated in Fig. 1 wherein it is seen that the burner is placed within the box 6 with the medicament holder in inverted position supported upon the burner, and with a sealing pad 10 of suitable material such as paraffined paper interposed between such holder and the burner, as clearly shown in Fig. 1. In order to keep the contained parts in proper position within the box I prefer to form upon the bottom of the box a projection which is in the present instance a circular bead 6$^a$ of a diameter slightly greater than that of the cup portion 1 of the burner, whereby the parts within the box are maintained in a central position. Moreover, the cover 9 of the box is adapted, when fitting upon the body portion of said box, to press against the central portion of the convex bottom of the holder 7, at which time such holder is in inverted position. The bottom of the holder is by preference made convex as just stated in order to insure a central contact or point of pressure between the lid and such holder with the result that the parts are held firmly within the box. The holder 7 is provided with a horizontal flange 7$^a$ and also a vertical marginal flange 7$^b$ which flanges coöperate with the flange 2$^d$ of the burner and with the sealing pad in order to seal the contents of the holder, such pad being held against displacement by means of the marginal flange 7$^b$.

Assuming that the burner is used in connection with a vaporizer, the parts are unpacked from the position shown in Fig. 1 and placed in the relative position shown in Fig. 2, water being introduced into the receptacle 6. The wicks are now lighted and some of the heat is conducted downwardly by the cup and inner shell to the fuel, whereby the latter, if of the solid or paraffin character, is caused to melt at points adjacent the wicks whereby the wicks are kept supplied with the fuel. The use of the common wick 4 in the bottom of the cup serves to feed all of the fuel therewithin to the several wicks.

In Fig. 4 I have shown a modified form of construction in which the fuel receptacle is shown as made in a single piece, the same being a receptacle or cup 11 having a marginal flange 11$^a$ and a series of slots 11$^b$ in the upper portion thereof through which the plurality of wicks 3 project at their upper ends. In all other respects the construction and operation are the same and corresponding reference characters are therefore employed in Fig. 4.

In Fig. 6 I have shown still another modified form of construction which is substantially the same as that of Fig. 2 with the exception that the cup 12 of the fuel receptacle is flared at its upper edge at 12$^a$ and that the wick 13 is a circular one as distinguished from the plurality of vertical wicks and with the further exception that the inner shell 14 is provided with an outermost vertical flange 14$^a$ which prevents the displacement of the sealing pad.

By preference and as shown, the box or container 6 is provided at its central portion with a depending projection which is here in the form of a circular bead which is engaged by and coöperates with the burner and thereby holds the box in proper central position. Moreover, by preference this box is provided at its lower corner with a depending marginal extension or flange 6$^c$ the purpose of which is to prevent any flame from passing straight up along the side of the box and thereby lessening the danger of the igniting of any fumes from the medicament used.

It will be understood from the foregoing description that the burner may be employed for any heating purpose besides the heating of water for vaporizing purposes and also that any suitable fuel may be used. The construction shown enables the parts to be packed within very small compass and provides a package of a regular or smooth exterior surface. Furthermore, the construction and arrangement are such that there is no danger of the fuel catching fire even though the water in the receptacle, or box 6 may have been entirely evaporated. Sufficient heat is conducted by the metal of the burner to melt the solid fuel if used but the interior of the fuel chamber is closed against any possible entrance of the flame itself thereto so that there is no danger of the body of the fuel catching fire. This latter feature is of considerable importance especially when the device is used as a vaporizer, in which case the burner is lighted and left to burn itself out in rooms or spaces which are closed and unattended.

The sealing pad is preferably made of thick paper, such as blotting paper or other substance of an absorbent nature, such as asbestos, which when saturated with paraffin, with the resultant tendency to adhere to the adjacent flanges, forms an hermetical seal, preventing deterioration of the medicament while stored for sale or future use.

I claim:

1. The combination of a receptacle adapted to contain a fuel, a wick extending upwardly along the sides of the receptacle and projecting laterally therefrom, and a container adapted to be supported by said receptacle.

2. The combination of a receptacle adapted to contain a fuel, a wick extending upwardly along the sides of the receptacle which has an opening through which the wick projects laterally formed, and a container adapted to be supported by said receptacle.

3. The combination of a receptacle adapted to contain a fuel and having a series of wick openings at its upper portion, a series of wicks extending upwardly along the sides of the receptacle and projecting through said openings and laterally formed.

4. The combination of a burner and a box which when closed is adapted to inclose the burner and which when open coöperates with the burner in operation, said box comprising a body portion and a cover, the former constituting an inclosing case and also a receptacle adapted to be supported by the fuel receptacle, and the latter constituting a cover for the body portion and a support or stand for the fuel receptacle.

5. The combination of a fuel receptacle, a box comprising a body portion and a cover, the former constituting an inclosing case and also a receptacle adapted to be supported by the fuel receptacle and the latter constituting a cover for the body portion and also a support or stand for the fuel receptacle, and a medicament holder having a convex bottom against the central portion of which the cover is arranged to press when the parts are packed together.

6. The combination of a burner, a medicament holder, means for supporting the holder above such burner for vaporizing the medicament, a pad adapted to seal the medicament in its holder, said holder and its pad being arranged to be inverted and to fit upon the burner.

7. The combination of a burner, a medicament holder, said burner having a marginal horizontal flange and the holder a circular rib, and means for supporting the holder above such burner for vaporizing the medicament, said holder being arranged to be inverted and to fit upon said flange of the burner and to be interlocked therewith by means of said rib.

8. The combination of a burner, a medicament holder, one of said parts having a marginal flange, and a sealing pad adapted to seal the medicament in its holder, said holder and its pad being arranged to be inverted and to fit upon the burner, the edges of said pad being contained by said flange.

9. The combination of a burner having a horizontal marginal flange, a medicament holder having two right angled marginal flanges, and a sealing pad adapted to seal the medicament in its holder and to be contained by the flanges thereof, said holder and pad being arranged to be inverted and to fit upon the burner flange.

10. The combination of a receptacle adapted to contain a fuel and comprising an outer cup and an open ended shell arranged therewithin and forming an annular space with the walls of such cup, and a wick arranged in said space and extending at its open end laterally of the outer cup.

11. The combination of a burner comprising a cup, an inner shell arranged therewithin and extended above the top of the cup, a wick between the cup and shell, and a receptacle adapted to contain the element to be heated and arranged to fit upon the shell and to thereby seal the interior thereof from the flame of the wick.

12. The combination of a receptacle adapted to contain a fuel and comprising an outer cylindrical cup and an open ended cylindrical shell arranged concentrically therewithin and forming an annular space with the walls of the cup, said shell extending to near the bottom of the cup and leaving a means of communication between said space and the interior of the shell which forms a fuel supply chamber, and a wick of uniform thickness and arranged in said space, which is of uniform width, the wick fitting said space whereby the rate of feed of fuel is established and made uniform on all sides of the burner.

13. The combination of a receptacle comprising an outer cup and an open ended shell arranged therewithin and adapted to contain the fuel, said shell forming an annular space with the walls of such cup, and a wick in said space, said cup having an opening at its upper portion through which the said wick extends and projects laterally, and said shell being marginally flanged at its upper end.

14. The combination of a receptacle adapted to contain a fuel and comprising an outer cup and an open ended shell arranged therewithin and forming an annular space with the walls of such cup, and a wick in said space, said cup having on its upper edge a series of notches forming wick openings, and said shell having a marginal flange resting upon the top edge of the cup.

15. The combination of a receptacle adapted to contain a fuel and comprising an outer cup and an open ended shell arranged therewithin and forming an annular space with the walls of such cup, and a plurality of wicks in said space, said cup having a series of wick openings for the upper ends of said wicks which project laterally at their upper ends from the cup.

16. The combination of a receptacle adapted to contain a fuel and comprising an outer cup and an open ended shell arranged therewithin and forming an annular space with the walls of such cup, a plurality of wicks in said space, and a wick upon the bottom of the cup and in contact with said plurality of wicks, said cup having a series of wick openings for the upper ends of said latter named wicks.

17. The combination of a burner, a box adapted to be supported thereon, a lid for such box adapted to support the burner, and a medicament holder having a convex bottom and adapted to be placed in upright position within and upon the bottom of the box when in operation and to be placed in inverted position upon the burner with its bottom in contact with the lid of the box when the parts are packed together.

GEORGE W. BENNETT.

Witnesses:
S. E. HIBBEN,
ROBERT DOBBERMAN.

Copies of this patent may be obtained for five cents each, by addressing the "Commissioner of Patents, Washington, D. C."